(12) United States Patent
Visser et al.

(10) Patent No.: US 12,286,320 B2
(45) Date of Patent: Apr. 29, 2025

(54) UNWINDING SYSTEM, ASSEMBLY AND METHOD FOR UNWINDING A TIRE COMPONENT FROM A STOCK REEL

(71) Applicant: VMI HOLLAND B.V., Epe (NL)

(72) Inventors: Ruben Visser, Epe (NL); Antonie Slots, Epe (NL); Herman Sebastiaan Scherpenhuizen, Epe (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 18/564,573

(22) PCT Filed: May 9, 2022

(86) PCT No.: PCT/NL2022/050250
§ 371 (c)(1),
(2) Date: Nov. 27, 2023

(87) PCT Pub. No.: WO2022/250529
PCT Pub. Date: Dec. 1, 2022

(65) Prior Publication Data
US 2024/0262065 A1     Aug. 8, 2024

(30) Foreign Application Priority Data

May 27, 2021   (NL) ..................................... 2028310
May 27, 2021   (NL) ..................................... 2028312

(51) Int. Cl.
*B65H 20/06* (2006.01)
*B29D 30/00* (2006.01)
(Continued)

(52) U.S. Cl.
CPC ......... *B65H 20/06* (2013.01); *B29D 30/0016* (2013.01); *B29D 30/2607* (2013.01);
(Continued)

(58) Field of Classification Search
CPC ................ B65H 20/06; B65H 23/0204; B65H 23/0326; B65H 2801/93; B29D 30/0016; B29D 30/2607
See application file for complete search history.

(56) References Cited

U.S. PATENT DOCUMENTS 3,836,022 A    9/1974 Ims
4,951,892 A    8/1990 Chaplin et al.
(Continued)

FOREIGN PATENT DOCUMENTS

CA    2372998 A1    8/2003
CN    1457974 A    11/2003
(Continued)

OTHER PUBLICATIONS

Decision to Grant from Corresponding Japanese Patent Application No. JP2022-552557, Jun. 25, 2024.
(Continued)

*Primary Examiner* — Sang K Kim
(74) *Attorney, Agent, or Firm* — Workman Nydegger (57) ABSTRACT

The invention relates to an unwinding system, an assembly and a method for unwinding a tire component from a stock reel and for outputting said tire component in a transport direction, wherein the unwinding system comprises a reel station, an output conveyor and a transfer device for transferring a leading end of the tire component from the reel station to said output conveyor, wherein the transfer device comprises a retaining member which is movable along a guide path between a pick-up position and a release position, wherein the retaining member comprises a retaining surface for releasably retaining the leading end of the tire component, wherein the transfer device further comprises an arm that is rotatable around the inverting axis for moving the retaining member along the guide path, wherein the retain-
(Continued)

ing member is movable with respect to the arm in an extension direction perpendicular to the inverting axis.

21 Claims, 10 Drawing Sheets

(51) Int. Cl.
  *B29D 30/26* (2006.01)
  *B65H 23/02* (2006.01)
  *B65H 23/032* (2006.01)
  *B65H 16/00* (2006.01)

(52) U.S. Cl.
  CPC ..... *B65H 23/0204* (2013.01); *B65H 23/0326* (2013.01); *B29D 2030/0038* (2013.01); *B29D 2030/2678* (2013.01); *B29D 2030/2685* (2013.01); *B65H 16/00* (2013.01); *B65H 2301/415095* (2013.01); *B65H 2301/44312* (2013.01); *B65H 2405/572* (2013.01); *B65H 2406/34* (2013.01); *B65H 2553/42* (2013.01); *B65H 2801/93* (2013.01)

(56) References Cited

U.S. PATENT DOCUMENTS

| | | | |
|---|---|---|---|
| 5,273,268 A | 12/1993 | Ogata | |
| 5,282,584 A * | 2/1994 | Yano | B65H 19/30 |
| | | | 242/530.2 |
| 2004/0139874 A1 | 7/2004 | Koizumi et al. | |
| 2018/0212892 A1 | 7/2018 | Xiao et al. | |
| 2020/0062525 A1 | 2/2020 | Hammer et al. | |
| 2021/0245464 A1 | 8/2021 | Hasegawa | |
| 2024/0253928 A1* | 8/2024 | Visser | B65H 20/06 |

FOREIGN PATENT DOCUMENTS

| | | |
|---|---|---|
| CN | 108582827 A | 9/2018 |
| DE | 9213634 U1 | 2/1994 |
| EP | 0649730 A1 | 4/1995 |
| EP | 3312112 A1 | 4/2018 |
| EP | 3795517 A1 | 3/2021 |
| JP | S594555 A | 1/1984 |
| JP | 4053177 B2 | 2/2008 |
| JP | 2011190061 A | 9/2011 |
| JP | 2018534830 A | 11/2018 |
| JP | 6566084 B1 | 8/2019 |
| JP | 2019534830 A | 12/2019 |
| JP | 6838288 B2 | 3/2021 |
| KR | 20180033755 A | 4/2018 |
| WO | 2018208146 A1 | 11/2018 |

OTHER PUBLICATIONS

Dutch Search Report from corresponding Dutch Patent Application No. NL2028310, Jan. 27, 2022.
Dutch Search Report from corresponding Dutch Patent Application No. NL2028312, Jan. 28, 2022.
International Search Report from corresponding PCT Application No. PCT/NL2022/050250, Jul. 21, 2022.

* cited by examiner

UNWINDING SYSTEM, ASSEMBLY AND METHOD FOR UNWINDING A TIRE COMPONENT FROM A STOCK REEL

BACKGROUND

The invention relates to an unwinding system, an assembly and a method for unwinding a tire component, in particular a breaker ply, from a stock reel and for outputting said tire component on a supply conveyor to be subsequently used for the manufacture of tires.

Known unwinding systems are arranged for receiving a cartridge with a stock reel that holds the length of a tire component. This cartridge is commonly arranged in the unwinding system such that the tire component exits the cartridge in a direction in-line with an output conveyor. When the stock reel is depleted, the unwinding system is temporarily halted, and the cartridge is manually exchanged for a full cartridge by an operator. The leading end of the tire component from the new cartridge is then manually placed on the output conveyor to allow the tire component to be subsequently used for the downstream manufacture of tires. The leading end of the tire component from the new cartridge is spliced to the trailing end of the previously supplied tire component on the output conveyor so that it can be pulled in by said trailing end.

SUMMARY OF THE INVENTION

A disadvantage of the known unwinding systems is that the operator has to manually transfer the leading end of the tire component from the new stock reel to the output conveyor. During this period, the infeed of the remaining length of the tire component is not possible as the leading end of the tire component from the new stock reel needs to be spliced to the trailing end of the preceding tire component.

The manual step furthermore requires the presence of an operator near the unwinding system and is a potentially hazardous operation, in particular when the tire component contains sharp elements such as steel cords.

The known unwinding systems unwind the tire component from the stock reel in a direction that is in-line with the output conveyor. As a result, this leads to a large footprint of the unwinding system on a factory floor. This effect is further magnified by the need for additional space in the apparatus to allow physical access of the operator to the unwinding system in order to transfer the leading edge of the tire component during the process of exchanging the cassette.

It is an object of the present invention to provide an unwinding system, an assembly and method for unwinding a tire component from a stock reel, wherein at least one of the aforementioned drawbacks can be reduced.

According to a first aspect, the invention provides an unwinding system for unwinding a tire component from a stock reel and for outputting said tire component in a transport direction, wherein the unwinding system comprises a reel station configured for receiving the stock reel, an output conveyor for conveying the tire component in the transport direction and a transfer device for transferring a leading end of the tire component from the reel station to said output conveyor, wherein the output conveyor extends at least partially above the reel station and comprises a conveying surface extending in a support plane parallel to the transport direction, wherein said conveying surface is arranged for receiving the tire component from the transfer device and for supporting said tire component at a first side of the support plane, wherein the transfer device comprises a retaining member which is movable along a guide path between a pick-up position at a second side of the support plane, opposite to the first side of the support plane, for picking up the leading end of the tire component from the reel station, and a release position at the first side of the support plane for disposing the leading end of the tire component on the conveying surface of the output conveyor, wherein the retaining member comprises a retaining surface for releasably retaining the leading end of the tire component to said retaining member, wherein, in the release position, the retaining surface is facing towards the support plane at the first side of said support plane, and wherein the retaining surface is offset between the release position and the pick-up position over at least ninety degrees about an inverting axis that is parallel to the support plane and perpendicular to the transport direction, wherein the transfer device further comprises an arm that is rotatable around the inverting axis for moving the retaining member along the guide path, wherein the retaining member is movable with respect to the arm in an extension direction perpendicular to the inverting axis.

By transferring the leading end of the tire component from the reel station to the output conveyor with the transfer device, the manual handling and repositioning of the leading end of the tire component can be eliminated. As a result, the process of picking up and placing the leading end on an output conveyor from the stock reel can be fully automated and no longer requires intervention by an operator. Additionally, due to the offset between the release position and the pick-up position, the direction from which the tire component exits the reel station does not need to be in-line with the output conveyor and can be placed at least partially underneath the output conveyor.

Furthermore, due to the automated transfer of the leading end, no additional space is needed in the unwinding system for physical access of the operator. As a result, the two aforementioned effects can lead to a synergistic reducing effect on the footprint of the unwinding system.

Because of the movability of the retaining member in the extension direction, the retaining member can follow, within a range of movement of the retaining member relative to the arm, a guide path comprising non-circular sections, or a combination of circular and non-circular sections. The retaining member may for example move with the tire component in a direction parallel to the transport direction for some distance beyond the release position. In other words, the retaining member can travel along the output conveyor in the transport direction, preferably at the same speed as said output conveyor. Hence, said retaining member can keep retaining the leading end of the tire component when said leading end is being conveyed in the transport direction by the output conveyor. In particular, the retaining member can guide the tire component over the output conveyor until a length of the tire component, sufficient for retaining the tire component to the output conveyor by friction alone, has been positioned over said output conveyor.

Preferably, the arm is provided with a guide element extending in the extension direction for slidably receiving a complementary element of the retaining member.

More preferably, the guide element is a slot.

In another embodiment the retaining surface, in the pick-up position, faces away from the support plane at the second side of said support plane. Hence, the orientation of the retaining surface, and consequently the leading end retained thereto, can be fully inverted or almost fully inverted from a starting orientation facing away from the support plane at the second side of said support plane, to final orientation facing towards the support plane from the first side of said support plane, without intervention of the operator. Hence, the reel station can be fitted compactly underneath the output conveyor, further reducing the footprint of the unwinding system.

In another embodiment the unwinding system further comprises the stock reel at the reel station, wherein the stock reel is rotatable about a stock reel axis, wherein the retaining surface of the retaining member faces away from the stock reel axis when the retaining member is in the pick-up position, and faces towards the stock reel axis when the retaining member is in the release position. Hence, the orientation of the leading end of the tire component can be flipped or placed up-side-down with respect to the starting orientation.

In another embodiment the retaining member is configured to rotate around the inverting axis. In another embodiment the guide path comprises a semi-circular or substantially semi-circular trajectory. A rotation, in particular following a semi-circular trajectory, can be a gradual way of inverting the orientation of the leading end, i.e. without damaging the tire component. The semi-circular trajectory can conveniently be positioned around the end of the output conveyor to move the leading end from the pick-up position at the second side of the support plane towards and/or into the release position at the first side of the support plane.

In another embodiment the retaining member is connected to the arm at a position spaced apart from the inverting axis, and wherein the retaining member is configured to pivot around the arm. The retaining member may thus automatically pivot relative to the arm to assume the best orientation for picking-up or releasing the tire component, while moving along the guide path.

In a further embodiment, the support plane extends at a first radius relative to the inverting axis in a direction normal to said support plane, wherein the semi-circular trajectory has a second radius greater than the first radius. Hence, the retaining member can be moved along a semi-circular trajectory into a position above, clear off and/or spaced apart from the conveying surface at the first side of said support plane, before moving towards said conveying surface from the first side of said support plane. In particular, the retaining member can be moved with clearance around the end of the output conveyor into said position above and/or clear off the conveying surface.

In a further embodiment the transfer device further comprises a guide track that is at least partially concentric to the semi-circular trajectory of the guide path, wherein the retaining member is configured for moving along said guide track. The guide track can further ensure that the retaining member follows the intended guide path.

In another embodiment the retaining member comprises a retaining body that defines the retaining surface and one or more retaining elements for retaining the leading end of the tire component to said retaining body at the retaining surface. Preferably, the one or more retaining elements comprises a magnet. More preferably, the retaining member comprises an actuator for moving the one or more retaining elements towards or away from the retaining surface. The magnet can magnetically attract a tire component that is cord-reinforced with metal cords, i.e. a breaker ply. By moving the magnet physically towards or away from the retaining surface, the magnetic force can be adjusted to selectively retain or release the tire component from the retaining member. The magnet can thus be a permanent magnet.

In another embodiment the retaining member further comprises a pressing member for pressing down the leading end of the tire component on the support surface of the output conveyor when said retaining member has released said leading end. The leading end of the tire component can thus be firmly held on the support surface of the output conveyor when releasing said leading end from the retaining surface. It can thus be prevented that the leading end slips back towards the reel station under the influence of gravity. Hence, the leading end does not have to be spliced to the trailing end of the previously supplied tire component. This means that the supply of the previously supplied tire component can be completed while at the same time the new tire component is being prepared for supply. The supply of tire components to the tire building drum can thus be more constant and/or the downtime of the tire component servicer can be reduced.

In another embodiment, that can also be applied independently of the unwinding system according to the first aspect of the invention, the unwinding system further comprises an anti-wrinkle roll and an anti-wrinkle drive for pressing the anti-wrinkle roll onto the tire component between the pick-up position and the stock reel. The anti-wrinkle roll can be used for reducing or ironing out wrinkles in the tire component when said tire component is being wound back onto the stock reel in a wind-up direction opposite to the transport direction. Hence, the tire component can be collected more uniformly on the stock reel.

Preferably, the reel station comprises one or more guide rolls for guiding the leading end of the tire component towards the pick-up position, wherein the anti-wrinkle roll is configured to cooperate with one guide roll of the one or more guide rolls. Hence, the anti-wrinkle roll and said one guide roll can together form a set of nipping rollers to press, smoothen and/or flatten any wrinkles in the tire component. Alternatively, the anti-wrinkle roll can press onto the tire component in a position between the guide rolls, for example in a position where the tire component is supported by the liner.

According to a second aspect, the invention provides an assembly comprising an unwinding system according to the first aspect of the invention as a first unwinding system, and further comprising an unwinding system according to the first aspect of the invention as a second unwinding system.

The unwinding systems can alternately supply tire components, thereby minimizing the interruption of the supply. In particular, the stock reel in one unwinding station can be replaced while the other unwinding station is operational.

According to a third aspect, the invention provides a method for unwinding a tire component from a stock reel and for outputting said tire component in a transport direction with the use of an unwinding system, wherein the unwinding system comprises a reel station configured for receiving the stock reel, and an output conveyor for conveying the tire component in the transport direction, wherein the output conveyor extends at least partially above the reel station and comprises a conveying surface extending in a support plane parallel to the transport direction, wherein the unwinding system further comprises a transfer device, wherein the method comprises the steps of: transferring a leading end of the tire component from a pick-up position at the reel station to a release position at the output conveyor with the use of the transfer device; and offsetting the orientation of the leading end of the tire component between the pick-up position and the release position over at least ninety degrees about an inverting axis that is parallel to the support plane and perpendicular to the transport direction.

Preferably or in other words, the method involves the step of inverting the leading end during the step of offsetting the orientation of the tire component between the pick-up position and the release position.

In a further embodiment the method further comprises the step of:

transferring the tire component, in particular a leading end of the tire component, from the release position at the output conveyor back to the pick-up position at the reel station. Transferring at least a part of the tire component, in particular the leading end of the tire component, back towards the reel station can be useful when an unused length of the tire component remains on the output conveyor, for example when changing over to a new batch. The unused length can thus be collected in the reel station to clear the output conveyor for a new batch. The recollected, unused length can be used for another batch.

Preferably, the method further comprises the steps of:
providing an anti-wrinkle roll at the reel station; and
pressing the anti-wrinkle roll onto the tire component between the pick-up position and the stock reel when the tire component is wound back onto the stock reel in a wind-up direction opposite to the transport direction.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1A-1F show an assembly 1 for unwinding a tire component 9, in particular a cord-reinforced tire component such as a breaker ply, to be used for the manufacture of tires, i.e. on a tire building drum (not shown) according to a first exemplary embodiment of the invention.

The assembly 1 comprises a first infeed or unwinding system 2 and a second infeed or unwinding system 3. The first unwinding system 2 comprises a first reel station 20 and the second unwinding system 3 comprises a second reel station 30. Each reel station 20, 30 is arranged for receiving a respective set of a stock reel 21, 31, a liner reel 22, 23 and a peeler 23, 33 for peeling a liner from the tire component 9 as it is being unwound. The stock reel 21, 31, the liner reel 22, 32 and the peeler 23, 33 are preferably formed as part of a cartridge or cassette, which can be easily removed from or inserted into a reel station 20, 30 as a single unit.

The first unwinding system 2 and the second unwinding system 3 each further comprises an output conveyor 24, 34 extending above the respective reel station 20, 30. In other words, the reel stations 20, 30 are located at least partially underneath the respective output conveyor 24, 34. The first unwinding system 2 and the second unwinding system 3 are arranged for alternately supplying continuous lengths of a tire component 9 from their respective stock reels 21, 31 to their respective output conveyors 24, 34, for output in the transport direction T towards the tire building drum.

The assembly 1 comprises a pick-and-place member 10 for picking up the tire component 9 from the output conveyor 24 of the first unwinding system 2 and for placing said picked up tire component 9 onto the output conveyor 34 of the second unwinding system 3, a further conveyor downstream of the second unwinding system 3 in the transport direction T or directly onto the tire building drum. In this example, the assembly 1 comprises a pick-and-place drive 11, preferably an XY-drive, for driving the movement of the pick-and-place member 10. The assembly 1 further comprises a cutter 12, at or downstream of the second unwinding system 3, which is configured to cut the tire component 9 into sections in order to produce cut-to-length pieces of the tire component 9 for the manufacture of tires.

The tire component 9 can alternately be unwound from the first unwinding system 2 or the second unwinding system 3 in order to maintain a substantially continuous supply of the tire component 9 to a tire manufacturing process downstream.

The output conveyors 24, 34 may be belt conveyors, roller conveyors or any other suitable type of conveyors. The output conveyor 24 of the first unwinding system 2 is oriented in-line with the output conveyor 34 of the second unwinding system 3 and both are in-line with the transport direction T. Each output conveyor 24, 34 has a conveying surface 25, 35 for supporting the tire component 9. The conveying surfaces 25, 35 extend in a support plane P.

While the second unwinding system 3 is shown in this exemplary embodiment to be similar to the first unwinding system 2, it is to be understood that the second unwinding system 3 can comprise elements that differ from the first unwinding system 2.

The invention will now be discussed in further detail with reference to the first unwinding system 2 only. The person skilled in the art that the features and functionalities described hereafter apply, mutatis mutandis, to the second unwinding system 3.

Figure 1A:
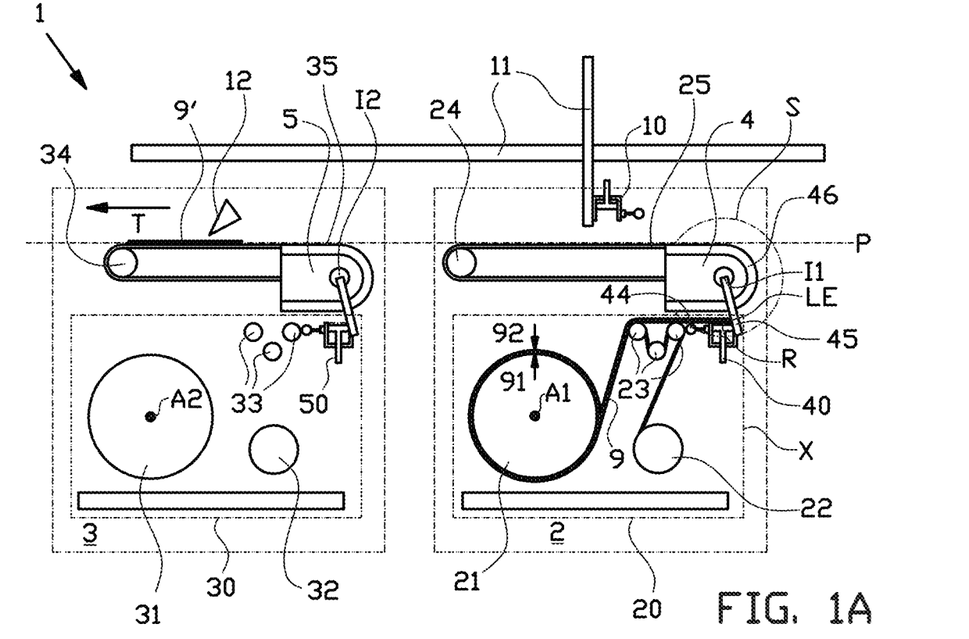
FIGS. 1A-1F show side views of an assembly with a first unwinding system and a second unwinding system according to a first exemplary embodiment of the invention, during a process of alternately unwinding and transferring a tire component from the first unwinding system or the second unwinding system from a stock reel to an output conveyor.

FIG. 1A shows the first unwinding system 2 with a fully filled stock reel 21 in the reel station 20. The stock reel 21 is rotatable around a stock reel axis A1. The reel station 20 may comprises a motor (not shown) for driving the rotation of the stock reel 21. The tire component 9 that originates from the stock reel 21 is passed through the peeler unit 23 in order to separate the liner from the tire component 9. The liner is wound up on the liner reel 22. The tire component 9 has a leading end LE that is ready to be picked up for transfer towards the output conveyor 24.

The first unwinding system 2 comprises an infeed device or a transfer device 4 configured for feeding-in or transferring the leading end LE of the tire component 9 from the reel station 20 to the conveying surface 25 of the output conveyor 24. The transfer device 4 comprises a retaining member 40 for retaining the leading end LE of the tire component 9 during the aforementioned transfer. The retaining member 40 and its operation is shown in more detail in FIGS. 3A-3E.

Figures 3A, 3B:
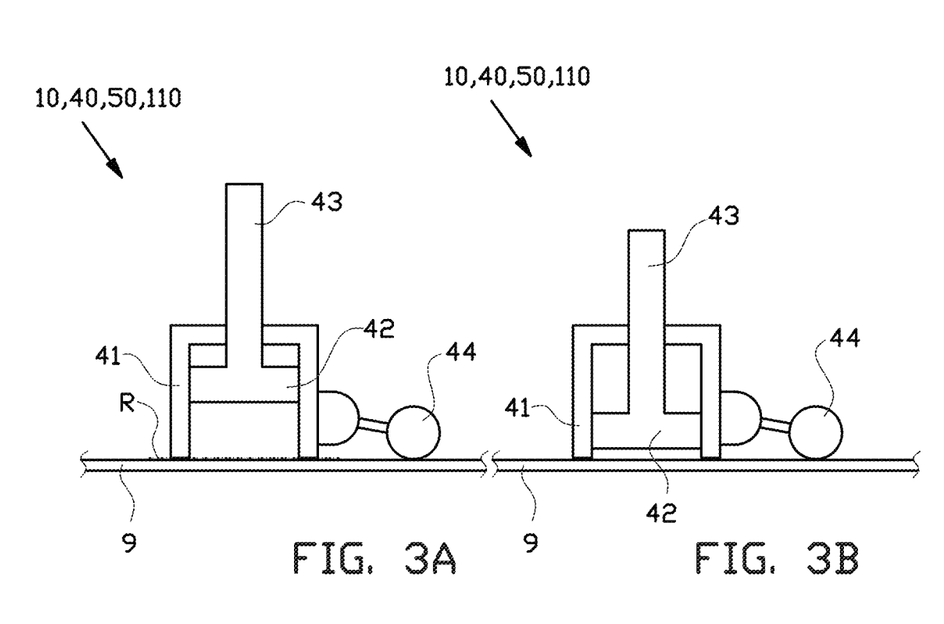
FIGS. 3A-3E show side views of a retaining member that is configured for picking up, transferring and depositing the leading end of the tire component during the different stages of its operation.

As shown in FIG. 3A, the retaining member 40 comprises a retaining body 41 that forms or defines a retaining surface R for engaging and/or retaining the leading end LE of the tire component 9. In this example, the retaining body 41 is hollow to accommodate a retaining element 42. The retaining element 42 is arranged for engaging and/or attracting the tire component 9, thereby retaining said tire component 9 to the retaining body 41. The retaining member 40 in this example comprises a retaining element 42 in the form of a magnet that magnetically attracts to the metal cords in the tire component 9. The retaining element 42 may be a permanent magnet that is physically moved towards the retaining surface R, as shown in FIG. 3B, and/or away from the retaining surface R, as shown in FIGS. 3A and 3C-3E. The retaining element 42 may be actively moved, i.e. with a actuator 43 such as a piston. Alternatively, a switchable electromagnet may be provided. In yet a further alternative embodiment, one or more retaining elements may be provided that retain the tire component 9 with vacuum or needles.

Figure 3C:
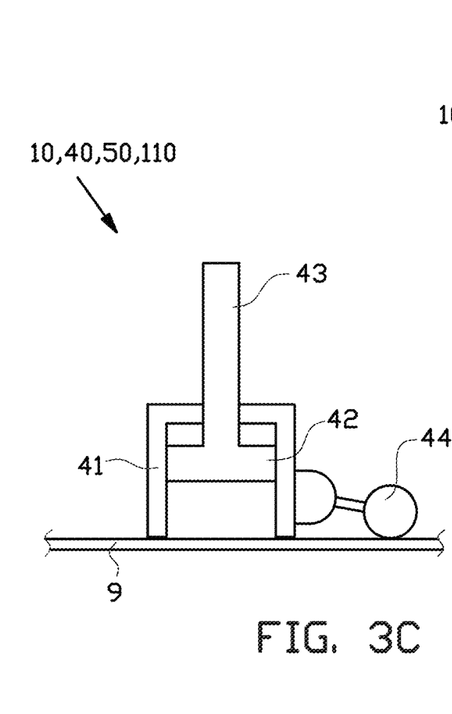
Figure 3D:
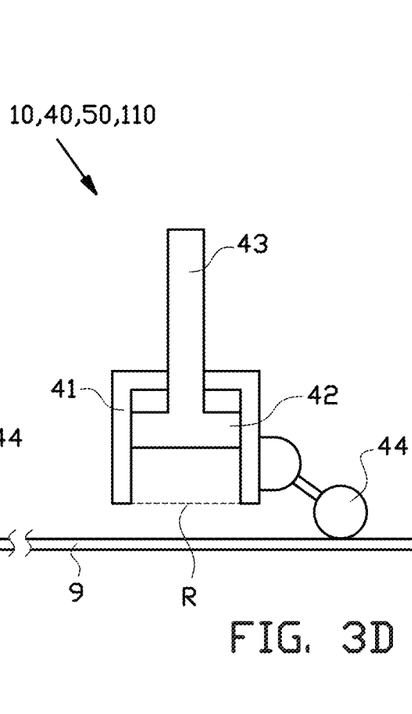

The retaining member 40 may optionally comprise a pressing element 44, in this example a pressing roller, for pressing down onto the tire component 9, as shown in FIGS. 3C and 3D, when it has been transferred onto the conveying surface 25 of the output conveyor 24.

Figure 1B:
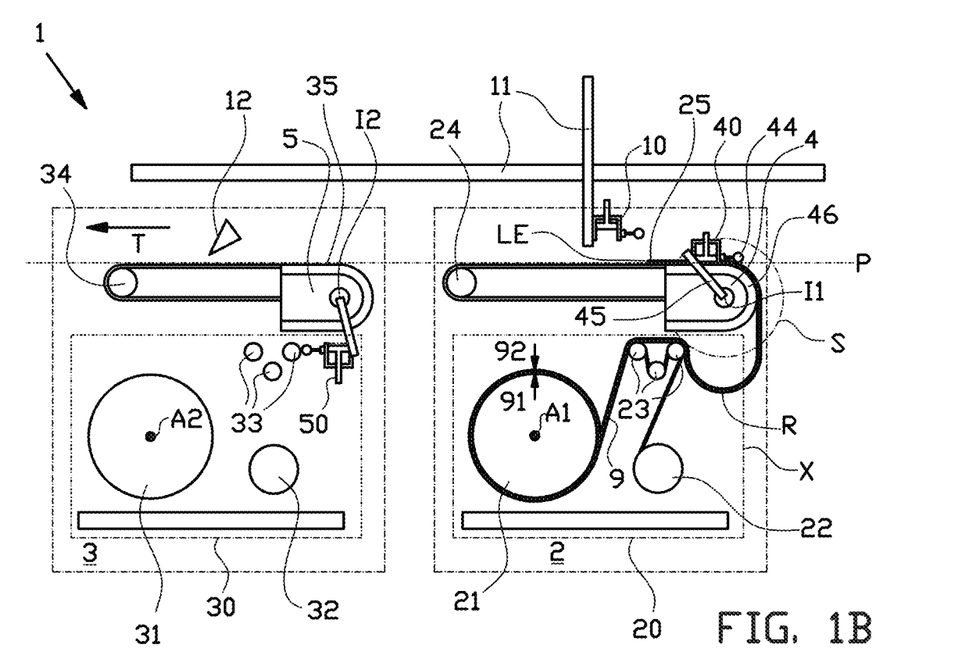
Figure 3E:
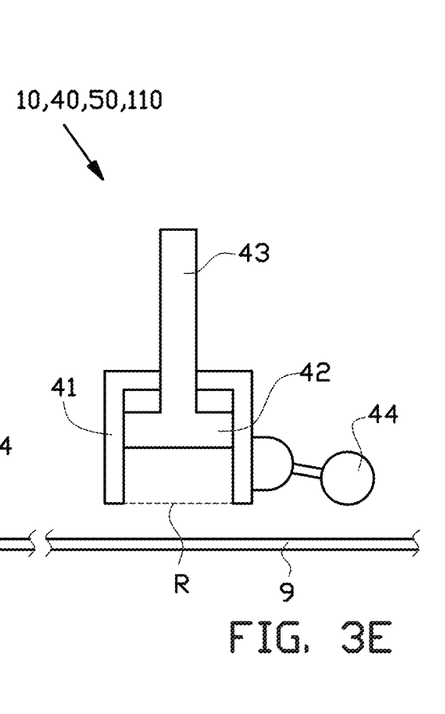

FIGS. 3A-3E show a possible sequence of operating the retaining member 40. FIG. 3A shows the situation in which the retaining body 41 is brought into contact with the tire component 9 at the retaining plane R, i.e. corresponding to the situation as shown in FIG. 1A. The retaining element 42 may now be activated, i.e. by moving the magnet towards the retaining surface R, as shown in FIG. 3B. FIG. 3C corresponds to the situation as shown in FIG. 1B, when the tire component 9 has been transferred onto the output conveyor 24. The retaining element 42 may now be deactivated, i.e. by moving the magnet away from the retaining surface R. The pressing member 44 may still be in pressing contact with the tire component 9 to prevent the tire component from slipping back. FIG. 3D shows an optional situation in which the retaining body 41 is already moved away from the tire component 9 while the pressing member 44 still presses the tire component 9. FIG. 3E shows the situation in which the retaining member 40 has fully released the tire component 9, i.e. when there is enough friction between the tire component 9 and the output conveyor 24 to prevent slipping back.

Figure 1C:
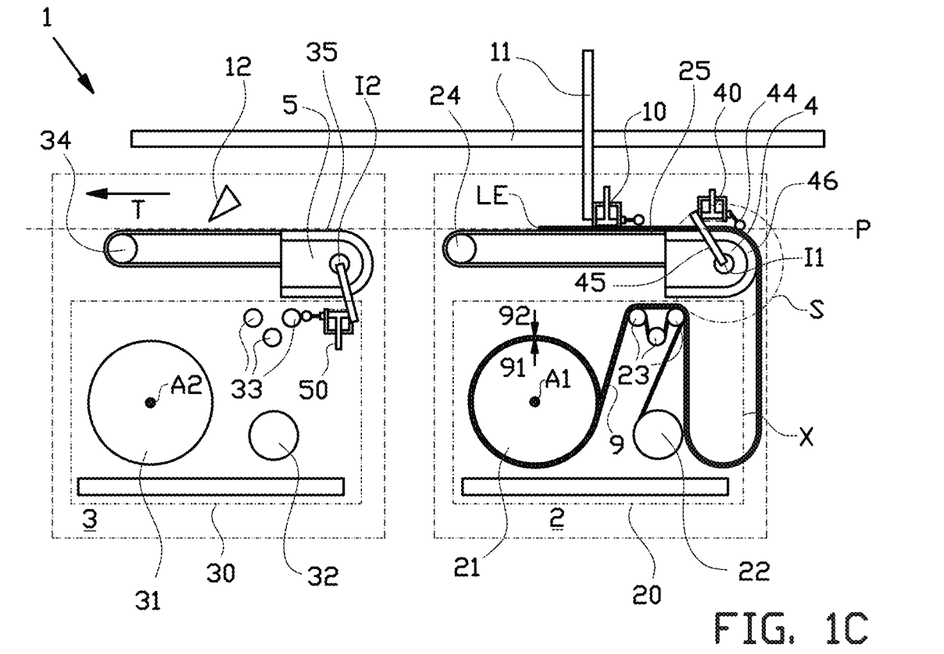

As shown in FIG. 1A, the transfer device 4 further comprises an arm 45 that is rotatable around the inverting axis I1. The inverting axis I1 is parallel to the support plane P and perpendicular to the transport direction T. The arm 12 is preferably driven by a motor in order to rotate the arm 12 around the inverting axis I1. The arm 45 is configured for moving the retaining member 40 along a guide path S between a pick-up position at the second side of the support plane P, as shown in FIG. 1A, a release position as shown in FIG. 1B and a hold position as shown in FIG. 1C. The guide path S is at least partially semi-circular about an inverting axis I1. The release position and the hold position are both at a first side of the support plane P. In this example, the first side of the support plane P is the side above the support plane P. The transfer device 4 further comprises a guide track 46 for guiding the retaining member 40 along said guide path S. The retaining member 40 may be provided with a cam (not shown) for engaging with the guide track 46.

Figure 4:
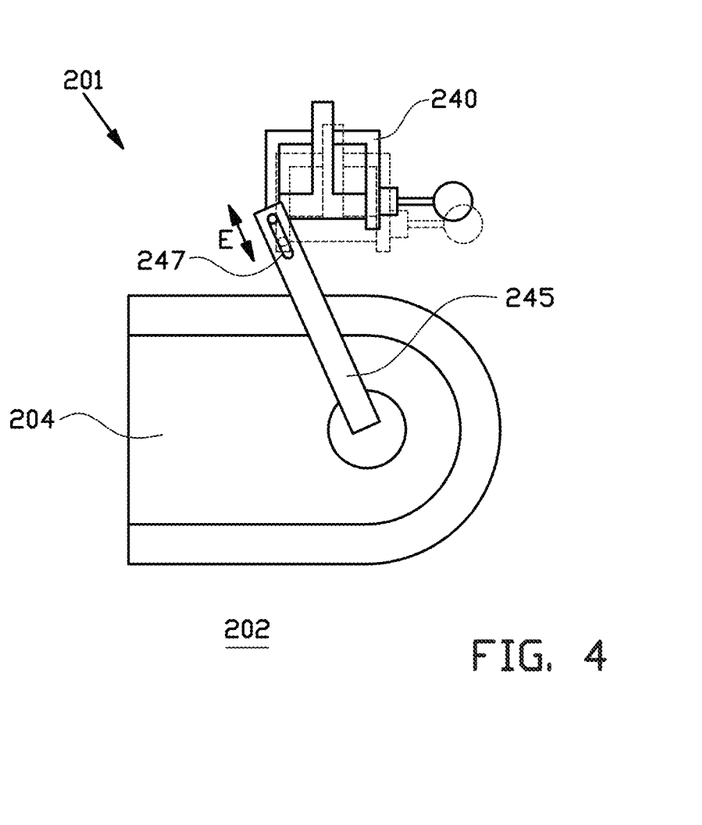
FIG. 4 shows a side view of an alternative unwinding system according to a third exemplary embodiment of the invention.

FIG. 4 shows an alternative assembly 201 having an unwinding system 201 in which the transfer device 204 differs from the previously discussed transfer device 4 in that its retaining member 240 is movable with respect to the arm 245 in an extension direction E perpendicular to the inverting axis I1. In particular, the arm 245 may be provided with a guide element, i.e. a slot 247, extending in the extension direction E for slidably receiving a complementary element of the retaining member 240. As a result, the retaining member 240 may follow a guide path S that is at least partially non-circular. The retaining member 240 may for example move with the tire component 9 in a direction parallel to the transport direction T for some distance beyond the release position.

Returning back to FIGS. 1A and 1B, it is shown that the retaining member 40 is rotatable relative to the arm 45 about a pivot axis spaced apart from the inverting axis I1. In particular, the pivot axis is located along the guide path S. Hence, the retaining member 40 can be adapted in orientation relative to the arm 45 to best position the tire component 9 relative to the conveying surface 25 of the output conveyor 24 in the release position and the hold position. As such, the orientation of retaining surface R, and thus the orientation of the leading end LE of the tire component 9 retained thereto, can be inverted between a starting orientation in which the tire component 9 has a first side 91 that is facing downwards in the pick-up position, as shown in FIG. 1A and final orientation in which said first side 91 of the tire component 9 is facing upwards. In particular, the retaining surface R is offset or rotated between the release position and the pick-up position over at least ninety degrees about an inverting axis I1 that is parallel to the support plane P and perpendicular to the transport direction T. In other words, the orientation of the retaining surface R, and thus of the leading end LE retained thereto, can be inverted or flipped up-side-down. More importantly, the output direction of the tire component 9 can be inverted or redirected from a direction at the reel station 20, away from the transport direction T, into a direction facing in or parallel to the transport direction T.

The support plane P extends at a first radius relative to the inverting axis I1, in a direction normal or perpendicular to said support plane P. The semi-circular trajectory has a second radius greater than the first radius. Hence, the retaining member 40 can be moved along a semi-circular trajectory into a position above and/or spaced apart from the support plane P at the first side of said support plane P, before moving towards said support plane P from said first side of said support plane P.

In this exemplary embodiment, the first side 91 of the tire component 9 faces radially outwards with respect to the stock reel axis A1, and a second side 92, opposite to said first side 91 faces radially inwards with respect to the stock reel axis A1 when the tire component 9 is wound around the stock reel 21. While the stock reel 21 is shown being unwound in a counterclockwise direction, it is noted that there is no preference towards either a clockwise or counterclockwise unwinding of the tire component 9 from the stock reel 21. When the retaining member 40, with the leading end LE of the tire component 9 retained thereto, is in the release position the first side 91 of the tire component 9 faces towards the support plane P. When the stock reel 21 is unwound in a clockwise direction instead, the second side 92 of the tire component 9 faces towards the support plane P when the leading end LE of the tire component 9, attached to the retaining member 40, is in the release position.

The second unwinding system 3 comprises a transfer device 5 with a retaining member 50 that is similar or identical to the previously discussed transfer device 4 with the retaining member 40 of the first unwinding system 2. The retaining member 50 of the second unwinding system 3 is rotatable about an inverting axis I2 parallel to the inverting axis I1 of the first unwinding system 2.

As shown in FIG. 1A, the pick-and-place member 10 is configured for transferring the leading end LE of the tire component 9 from the output conveyor 24 of the first unwinding system 2 to the output conveyor 34 of the second unwinding system 3. The pick-and-place member 10 may be similar or identical to the previously discussed retaining member 40, see FIGS. 3A-3E. The pick-and-place member 10 is movable in a travel plane that is parallel to the transport direction T and perpendicular to the support plane P. In particular, the assembly 1 comprises a pick-and-place drive 11, preferably an XY drive, that is configured for moving the pick-and-place member 10 in the aforementioned travel plane.

Figure 5A:
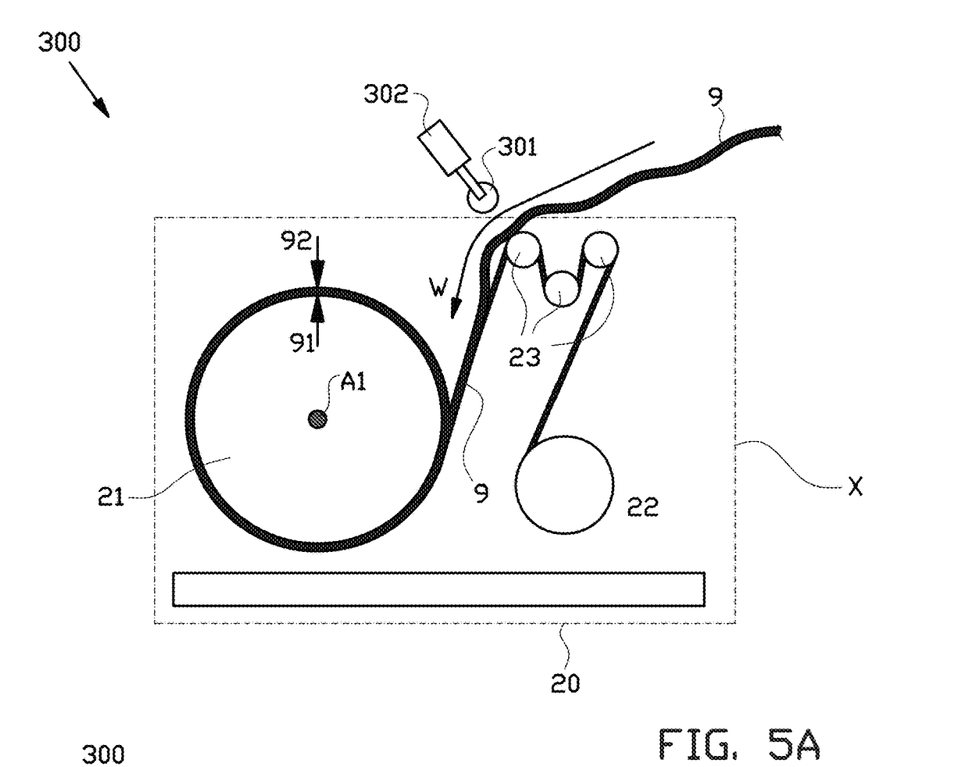
FIGS. 5A and 5B show side views of a further alternative unwinding system according to a fourth exemplary embodiment of the invention.
Figure 5B:
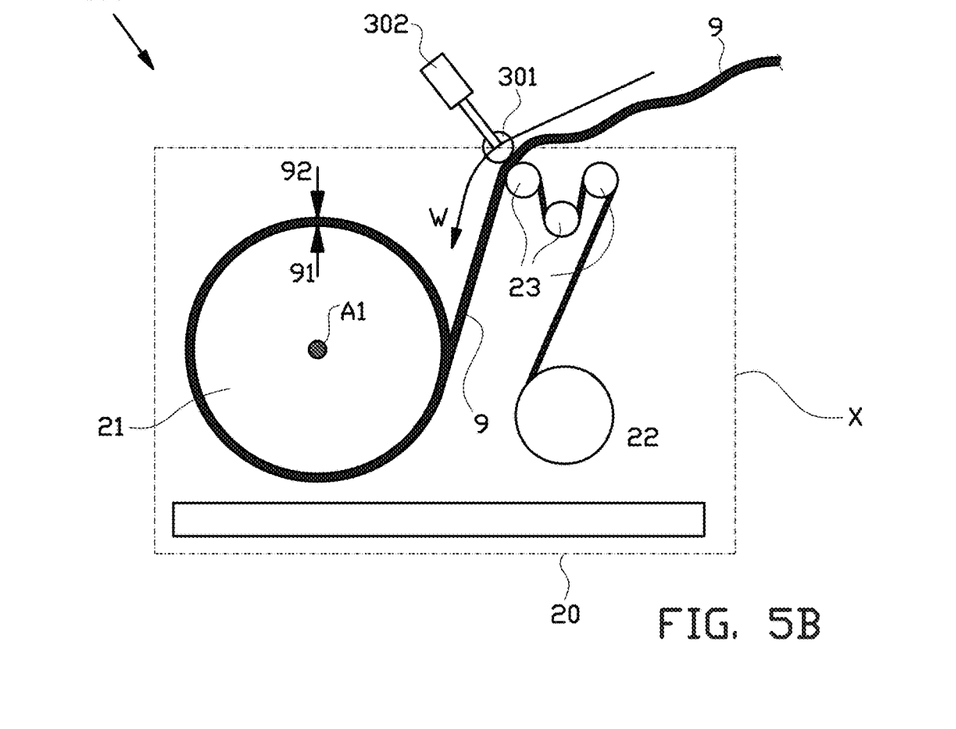

FIGS. 5A and 5B show an alternative unwinding system 300 according to a fourth exemplary embodiment of the invention with an anti-wrinkle roll 301 for reducing or ironing out wrinkles in the tire component 9 when said tire component 9 is being wound back onto the stock reel 6 in a wind-up direction W opposite to the transport direction T. The alternative unwinding system 300 further comprises an anti-wrinkle drive 302 for moving or pressing the anti-wrinkle roll 301 onto the tire component 9 between the pick-up position and the stock reel 6. In particular the anti-wrinkle drive 302 moves said anti-wrinkle roll 301 between an active position opposite to one of the guide rolls 161 of the reel station 160 and an inactive position further spaced apart from said one guide roll 161. In the active position the anti-wrinkle roll 301 cooperates with said one guide roll 161 to press, smoothen and/or flatten any wrinkles in the tire component 9. The method for unwinding the tire component 9 with the use of the previously discussed assembly 1 will now be elucidated with reference to FIGS. 1A-1F.

FIG. 1A shows a point in time at which the retaining member 40 of the first unwinding system 2 has picked up the leading end LE of the tire component 9 in the pick-up position of the corresponding reel station 20. A trailing end TE of a previously supplied tire component 9' is visible on the output conveyor 34 of the second unwinding system 3. This previously supplied tire component 9' may be conveyed further towards the tire building drum independently of the unwinding of the tire component 9 in the first unwinding system 2.

FIG. 1B shows the situation in which the transfer device 4 of the first unwinding system 2 has moved the retaining member 40, with the leading end LE of the tire component 9 retained thereto, to the release position at the first side of the support plane P, directly above the conveying surface 25 of the output conveyor 24 of the first unwinding system 2. In the release position, the tire component 9 is placed or disposed in contact with the conveying surface 25. The first side 91 of the tire component faces towards the conveying surface 25, and the leading end LE of the tire component 9 is now pointing in a direction in-line with or parallel to the transport direction T.

FIG. 1C shows the retaining member 40 in the hold position, in which the pressing element 44 of the retaining member 40 presses the tire component 9 down on the conveying surface 25 of the output conveyor 24. This ensures that the leading end of the tire component 9 remains in contact with the output conveyor 24 and does not slip back under the influence of gravity while allowing the output conveyor 24 to transport the tire component 9 further in the transport direction T.

Furthermore, FIG. 1C shows the pick-and-place member 10 brought into contact with the leading end LE of the tire component 9 that is situated on the output conveyor 24 of the first unwinding system 2 in order to retain the leading edge LE of the tire component 9 thereto. In addition, FIG. 1C illustrates that the portion of the tire component 9 downstream of the leading end LE is allowed to slack.

Figure 1D:
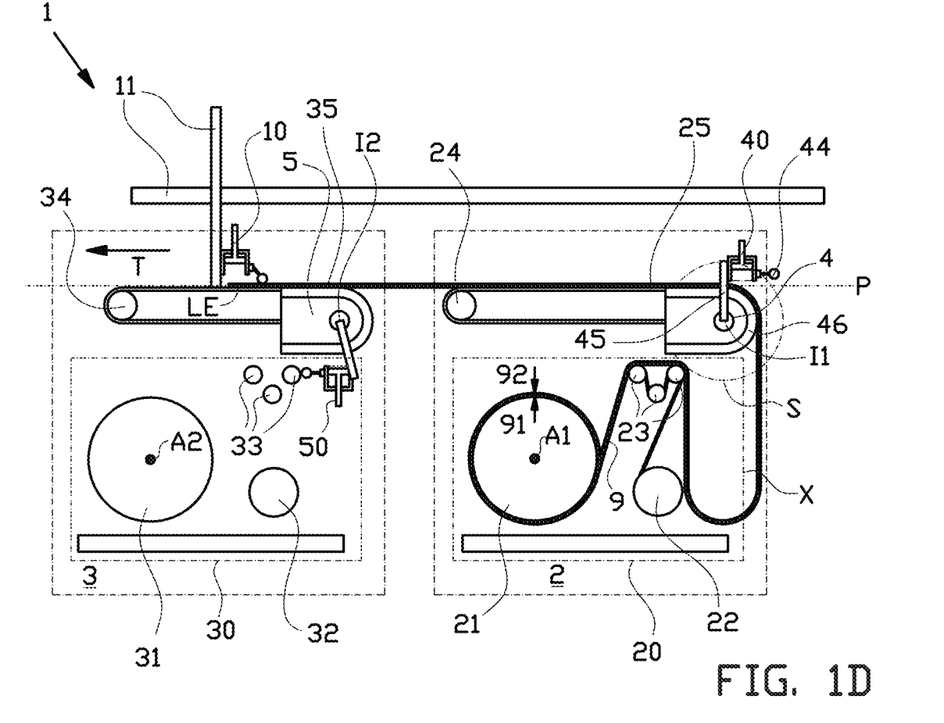

FIG. 1D shows that the pick-and-place member 10 has transferred the leading end LE of the tire component 9 from the output conveyor 24 of the first unwinding system 2 to the output conveyor 34 of the second unwinding system 3. Now, the pressing element of the pick-and-place member 10 optionally presses down onto the leading end LE of the tire component 9, to ensure that the output conveyor 34 of the second unwinding system 3 can reliably convey the tire component 9 further in the transport direction T. During this process, the transfer device 5 of the second unwinding system 3 may be moved into a position in which it does not hinder the operation of the pick-and-place member 10.

Figure 1E:
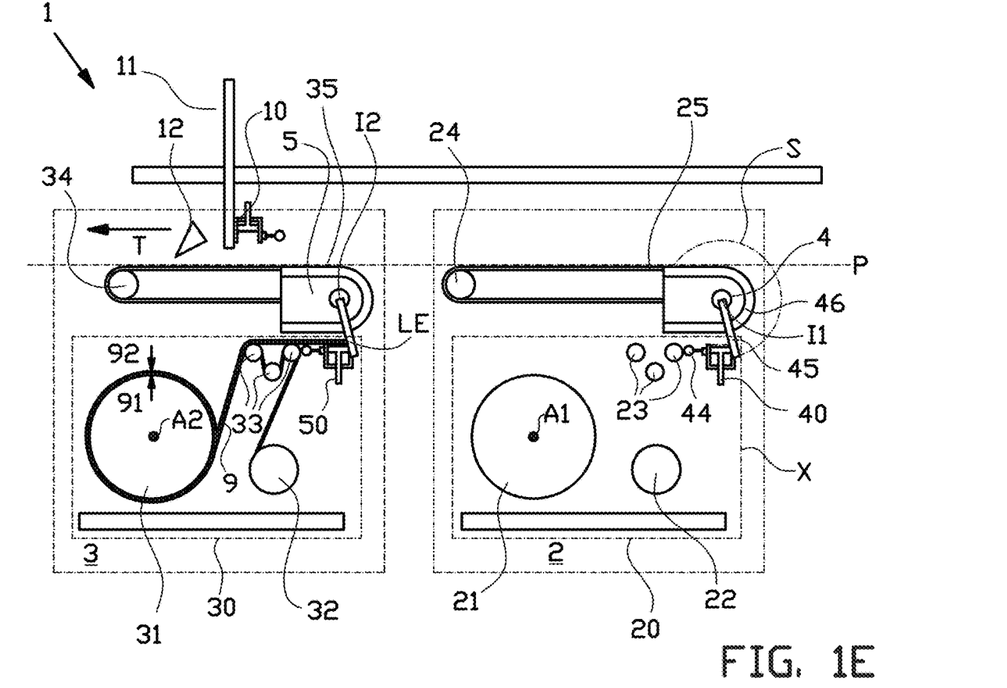

FIG. 1E shows an empty stock reel 21 in the reel station 20 of the first unwinding system 2 and a new, filled stock reel 31 in the reel station 30 of the second unwinding system 3 ready to be unwound. The full stock reel 31 in the reel station 30 of the second unwinding system 3 can conveniently be placed prior to the depletion of the stock reel 21 in the reel station 20 of the first unwinding system 2. The leading end LE of the tire component 9 from the fresh stock reel 31 is in the process of being retained by the transfer device 5 of the second unwinding system 3. The assembly 1 is now able to repeat the process as described for the first unwinding system 2 for the second unwinding system 3, with the exception of the transfer by the pick-and-place unit 10 between the output conveyors 24, 34, because in this case, the transfer device 5 of the second unwinding system 3 can transfer the leading end LE of the tire component 9 directly onto the output conveyor 34 of the second unwinding system 3.

Figure 1F:
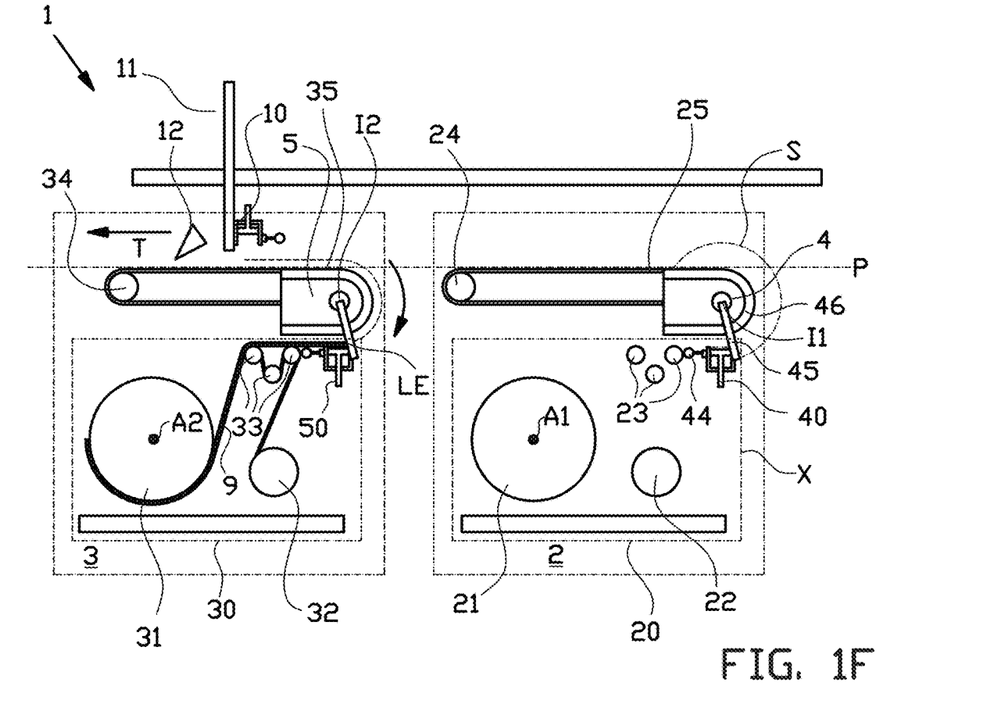

FIG. 1F shows the situation in which an unused or waste length of the tire component 9 has been transferred or fed back towards, in this example, the reel station 30 of the second unwinding system 3. This may be useful to clear the output conveyor 24 prior to a switchover to a new batch or a new cycle of the method. In particular, the retaining member 40 is positioned in the release position overhead the tire component 9 at or near the leading end LE of said tire component 9. Subsequently, the leading end LE is engaged. The arm 45 is then returned or rotated backwards from the release position to pick-up position, where the leading end LE is transferred back to the stock reel 31. FIGS. 1A-1F have shown the assembly 1 according to the first exemplary embodiment in which the tire component 9 exits the first reel station 60 and the second reel station 160 at an output side X which faces away from the travel direction T.

Figure 2A:
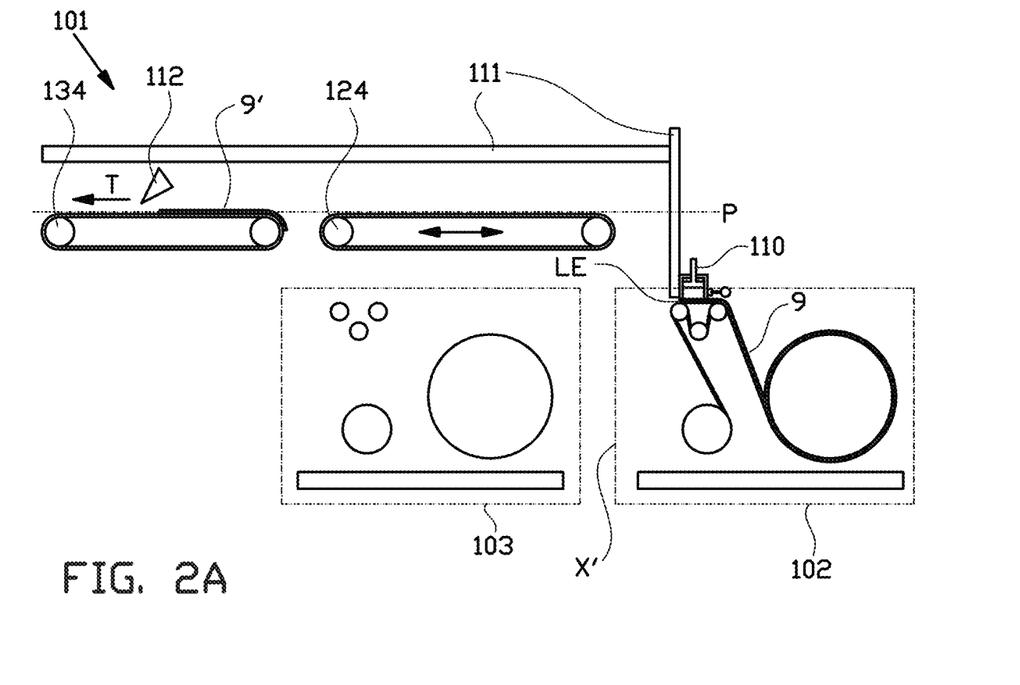
FIGS. 2A-2D show side views of an alternative unwinding system according to a second exemplary embodiment of the invention, during a process of alternately unwinding and transferring the tire component from a first reel station or a second reel station to an output conveyor.
Figure 2B:
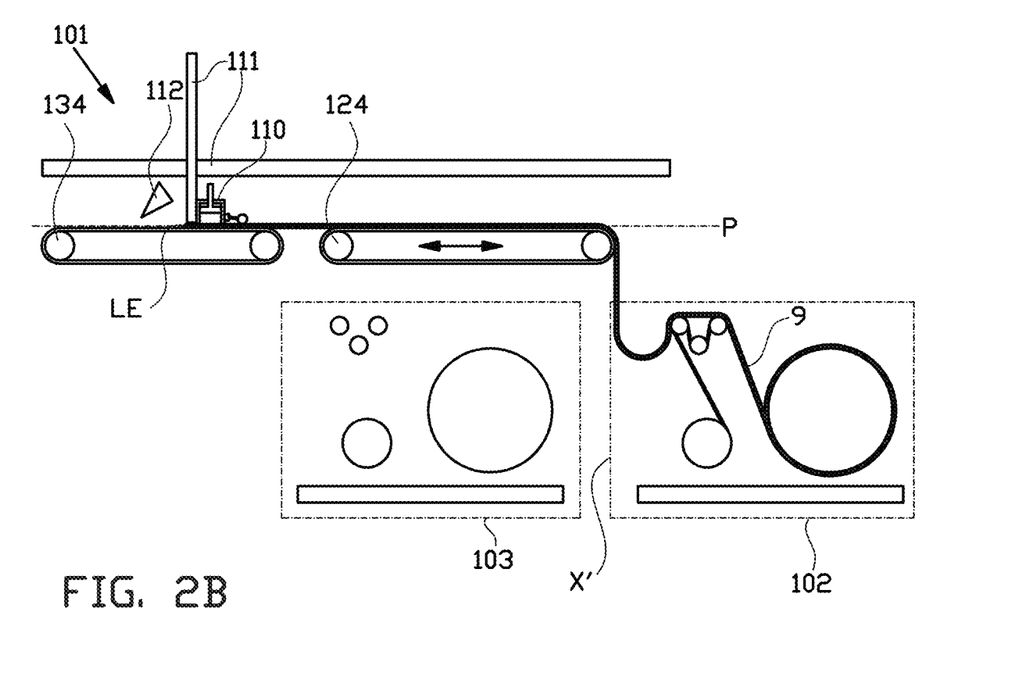
Figure 2C:
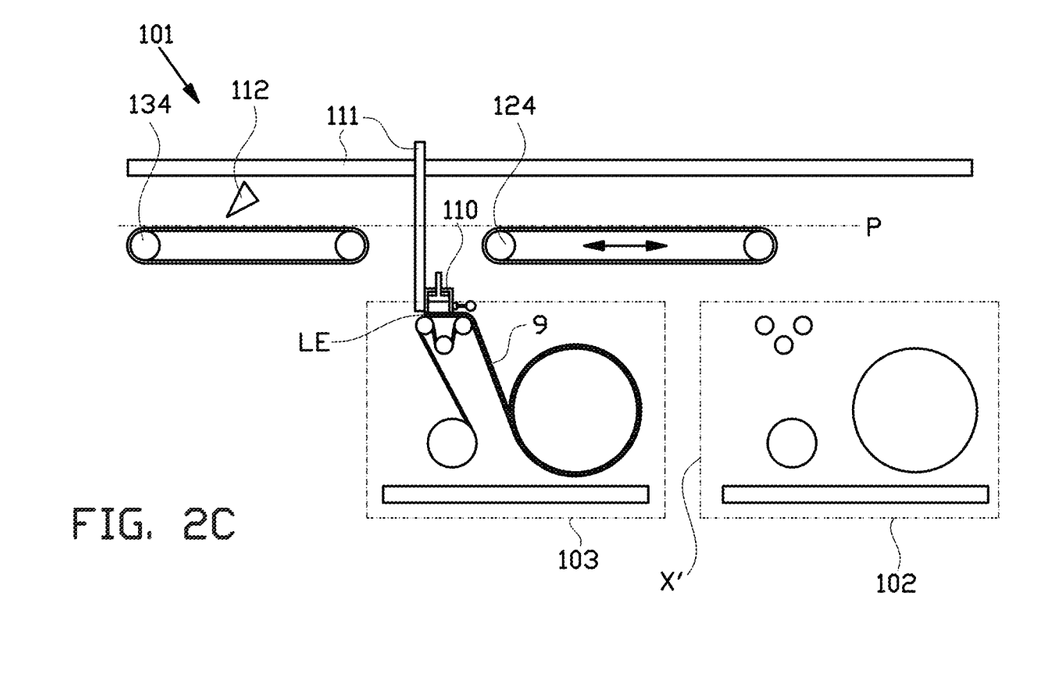
Figure 2D:
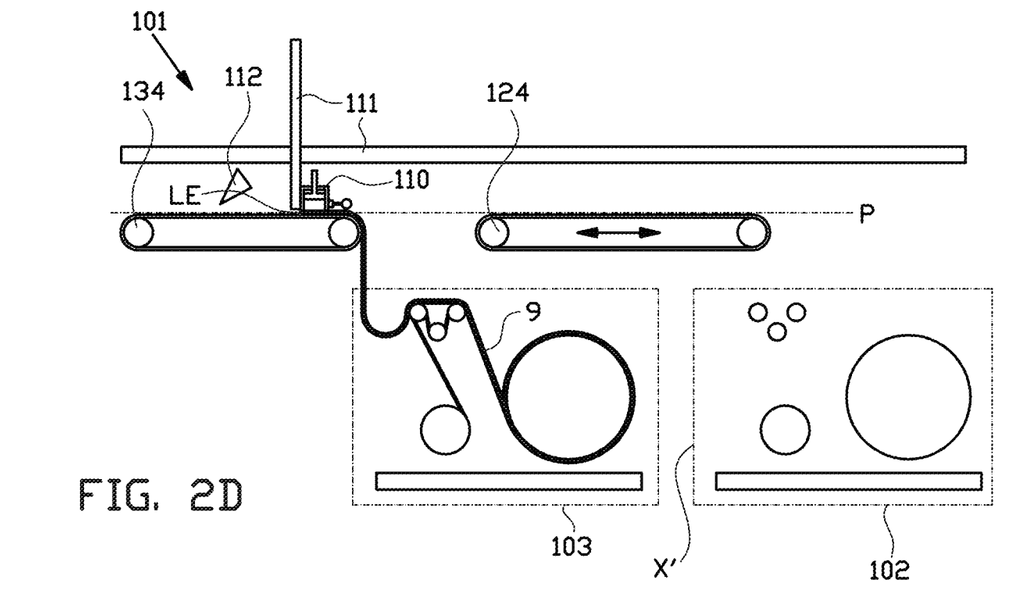

FIGS. 2A, 2B and 2C, in contrast, show an alternative assembly 101 in which the tire components 9 exit the unwinding systems 102, 103 at an alternative output side X' that faces in or towards the transport direction T. In other words, the unwinding systems 102, 103 of the alternative assembly 101 are pointing or facing the other away. Consequently, the leading end LE of the tire components 9 do not have to be flipped or inverted. Instead, they can be picked-up and released by a pick-and-place member 110 travelling in a travel plane parallel to the transport direction T and perpendicular to the support plane P defined by the output conveyors 124, 134. The alternative assembly 101 comprises a pick-and-place drive 111, preferably an XY drive, that is configured for moving the pick-and-place member 110 in the aforementioned travel plane.

Note that the output conveyors 124, 134 are positioned downstream of their respective unwinding system 102, 103 in the transport direction T, or can be moved into such a position, to allow for the travel of said pick-and-place member 110. In particular, the output conveyor 124 of the first unwinding system 102 may be movable in a displacement direction D parallel to the transport direction T between a position that is at least partially overhead the second unwinding system 103, to receive the tire component 9 from the first unwinding system 102, and a standby position, as shown in FIG. 2C, to make room for the pick-and-place member 110 to move down between the output conveyors 124, 134 to pick-up a tire component 9 from the second unwinding system 103. When unwinding the tire component 9 from the first unwinding system 102, the tire component 9 is moved over both the output conveyor 124 of the first unwinding system 102 and the output conveyor 134 of the second unwinding system 103 by the same single pick-and-place member 110. Alternatively, a further pick-and-place member may be provided, as in FIGS. 1A-1F, to perform the transfer between the output conveyors 124, 134.

The pick-and-place member 110 may have the same or an identical configuration as the previously discussed retaining member 40, see FIGS. 3A-3E.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to an unwinding system 2, an assembly 1 and a method for unwinding a tire component 9 from a stock reel 21 and for outputting said tire component 9 in a transport direction T, wherein the unwinding system 2 comprises a reel station 20, an output conveyor 24 and a transfer device 4 for transferring a leading end LE of the tire component 9 from the reel station 20 to said output conveyor 24, wherein the transfer device 4 comprises a retaining member 40 which is movable along a guide path S between a pick-up position and a release position, wherein the retaining member 40 comprises a retaining surface R for releasably retaining the leading end LE of the tire component 9, wherein the transfer device 204 further comprises an arm 245 that is rotatable around the inverting axis I1 for moving the retaining member 240 along the guide path S, wherein the retaining member 240 is movable with respect to the arm 245 in an extension direction E perpendicular to the inverting axis I1.

The invention claimed is:

1. An unwinding system for unwinding a tire component from a stock reel and for outputting said tire component in a transport direction,
wherein the unwinding system comprises:
a reel station configured for receiving the stock reel;
an output conveyor for conveying the tire component in the transport direction; and
a transfer device for transferring a leading end of the tire component from the reel station to said output conveyor,
wherein the output conveyor extends at least partially above the reel station and comprises a conveying surface extending in a support plane parallel to the transport direction,
wherein said conveying surface is arranged for receiving the tire component from the transfer device and for supporting said tire component at a first side of the support plane,
wherein the transfer device comprises a retaining member which is movable along a guide path between a pick-up position at a second side of the support plane, opposite to the first side of the support plane, for picking up the leading end of the tire component from the reel station, and a release position at the first side of the support plane for disposing the leading end of the tire component on the conveying surface of the output conveyor,
wherein the retaining member comprises a retaining surface for releasably retaining the leading end of the tire component to said retaining member,
wherein, in the release position, the retaining surface is facing towards the support plane at the first side of said support plane, and
wherein the retaining surface is offset between the release position and the pick-up position over at least ninety degrees about an inverting axis that is parallel to the support plane and perpendicular to the transport direction,
wherein the transfer device further comprises an arm that is rotatable around the inverting axis for moving the retaining member along the guide path,
wherein the retaining member is movable with respect to the arm in an extension direction perpendicular to the inverting axis.

2. The unwinding system according to claim 1, wherein the arm is provided with a guide element extending in the extension direction for slidably receiving a complementary element of the retaining member.

3. The unwinding system according to claim 2, wherein the guide element is a slot.

4. The unwinding system according to claim 1, wherein the retaining surface, in the pick-up position, faces away from the support plane at the second side of said support plane.

5. The unwinding system according to claim 1, wherein the unwinding system further comprises the stock reel at the reel station,
wherein the stock reel is rotatable about a stock reel axis,
wherein the retaining surface of the retaining member faces away from the stock reel axis when the retaining member is in the pick-up position and faces towards the stock reel axis when the retaining member is in the release position.

6. The unwinding system according to claim 1, wherein the retaining member is configured to rotate around the inverting axis.

7. The unwinding system according to claim 1, wherein the guide path comprises a semi-circular trajectory.

8. The unwinding system according to claim 7, wherein the support plane extends at a first radius relative to the inverting axis in a direction normal to said support plane, wherein the semi-circular trajectory has a second radius greater than the first radius.

9. The unwinding system according to claim 1, wherein the retaining member is connected to the arm at a position spaced apart from the inverting axis, and
wherein the retaining member is configured to pivot around the arm.

10. The unwinding system according to claim 1, wherein the transfer device further comprises a guide track that is at least partially concentric to the semi-circular trajectory of the guide path,
wherein the retaining member is configured for moving along said guide track.

11. The unwinding system according to claim 1, wherein the retaining member comprises a retaining body that defines the retaining surface and one or more retaining elements for retaining the leading end of the tire component to said retaining body at the retaining surface.

12. The unwinding system according to claim 11, wherein the one or more retaining elements comprises a magnet.

13. The unwinding system according to claim 12, wherein the retaining member comprises an actuator for moving the one or more retaining elements towards or away from the retaining surface.

14. The unwinding system according to claim 1, wherein the retaining member further comprises a pressing member for pressing down the leading end of the tire component on the support surface of the output conveyor when said retaining member has released said leading end.

15. The unwinding system according to claim 1, wherein the unwinding system further comprises an anti-wrinkle roll and an anti-wrinkle drive for pressing the anti-wrinkle roll onto the tire component between the pick-up position and the stock reel.

16. The unwinding system according to claim 15, wherein the reel station comprises one or more guide rolls for guiding the leading end of the tire component towards the pick-up position,
wherein the anti-wrinkle roll is configured to cooperate with one guide roll of the one or more guide rolls.

17. An assembly comprising a first unwinding system and a second unwinding system, each of the first unwinding system and the second unwinding system being an unwinding system according to claim 1.

18. A method for unwinding a tire component from a stock reel and for outputting said tire component in a transport direction with the use of an unwinding system according to claim 1,
wherein the unwinding system further comprises a transfer device, wherein the method comprises the steps of:
transferring a leading end of the tire component from a pick-up position at the reel station to a release position at the output conveyor with the use of the transfer device; and
offsetting the orientation of the leading end of the tire component between the pick-up position and the release position over at least ninety degrees about an inverting axis that is parallel to the support plane and perpendicular to the transport direction.

19. The method according to claim 18, wherein the orientation of leading end is inverted during the step of offsetting the orientation of the tire component between the pick-up position and the release position.

20. The method according to claim 18, wherein the method further comprises the step of:
transferring a leading end of the tire component from the release position at the output conveyor back to the pick-up position at the reel station.

21. The method according to claim 20, wherein the method further comprises the steps of:
providing an anti-wrinkle roll at the reel station; and
pressing the anti-wrinkle roll onto the tire component between the pick-up position and the stock reel when the tire component is wound back onto the stock reel in a wind-up direction opposite to the transport direction.

* * * * *